March 31, 1959 W. ULKE 2,879,951
ICE CRUSHING MACHINE
Filed Oct. 14, 1957 4 Sheets-Sheet 1

Inventor
William Ulke

March 31, 1959     W. ULKE     2,879,951
ICE CRUSHING MACHINE
Filed Oct. 14, 1957                        4 Sheets-Sheet 2
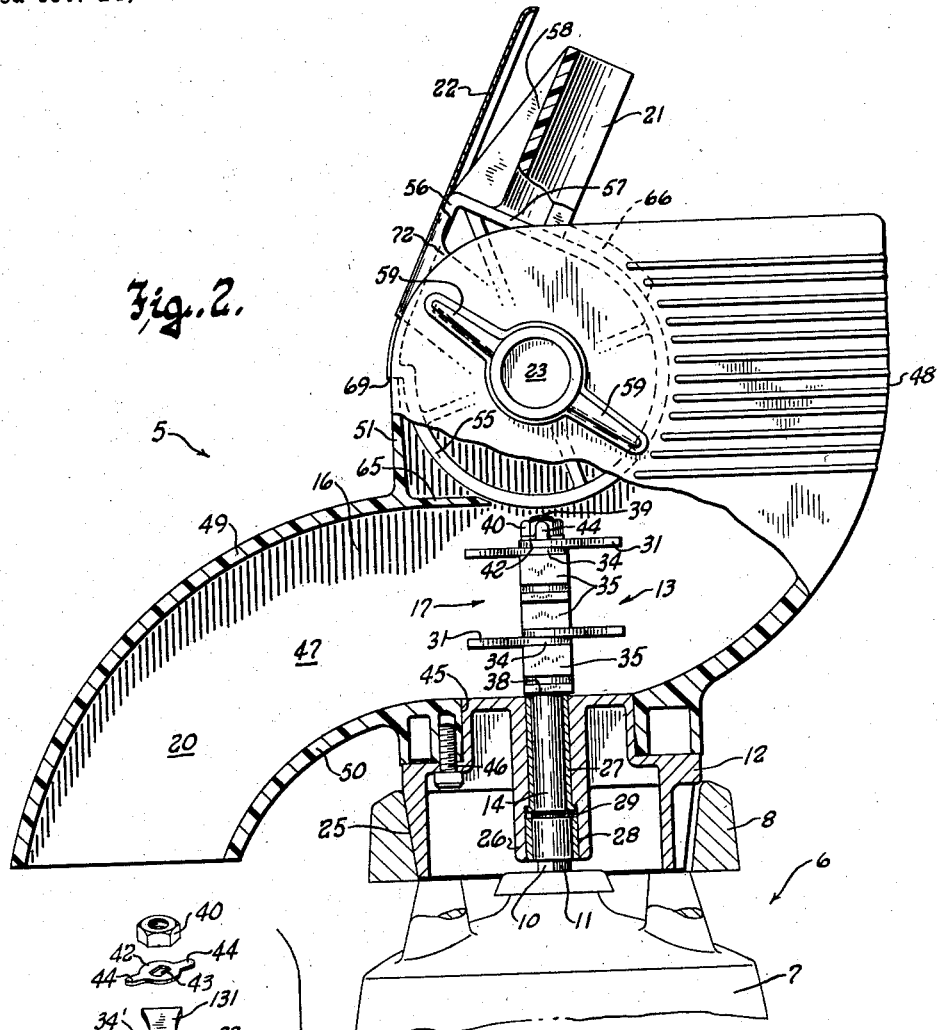
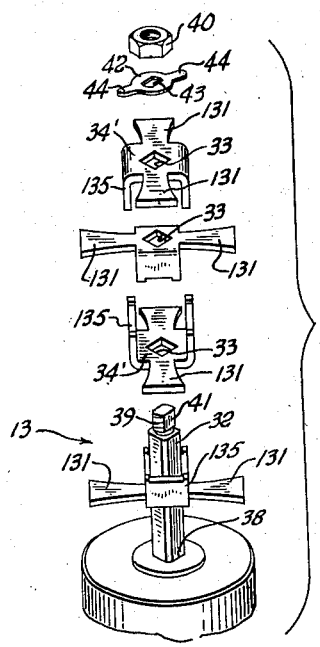
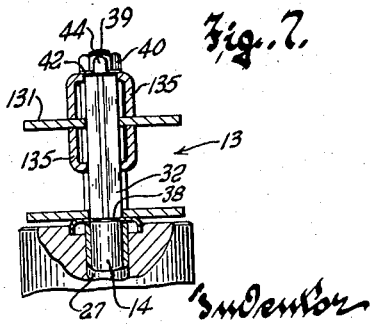
Inventor
William Ulke March 31, 1959 W. ULKE 2,879,951
ICE CRUSHING MACHINE
Filed Oct. 14, 1957 4 Sheets-Sheet 3

Inventor
William Ulke
By
Attorney

March 31, 1959 W. ULKE 2,879,951
ICE CRUSHING MACHINE
Filed Oct. 14, 1957 4 Sheets-Sheet 4

Inventor
William Ulke
By Hamilton Jones
Attorney

United States Patent Office 2,879,951
Patented Mar. 31, 1959

2,879,951

ICE CRUSHING MACHINE

William Ulke, Milwaukee, Wis., assignor to John Oster Manufacturing Co., Milwaukee, Wis., a corporation of Wisconsin Application October 14, 1957, Serial No. 690,067

4 Claims. (Cl. 241—186)

This invention relates to ice crushing machines and refers more particularly to an ice crusher adapted to be driven by power means having a vertical power takeoff shaft.

In general, it is an object of this invention to provide an ice crushing machine which is adapted to be mounted on a power stand for a food comminuting machine or the like. Such a power stand forms a pedestal support for various power driven appliances and comprises an enclosure which houses a motor and an upright rotatable power takeoff shaft that is drivingly connected with the motor and has its upper end accessibly projecting out of the enclosure for connection to an appliance detachably mounted on the power stand. Most commonly the appliance used with the power stand is a food comminuting machine, comprising an upright vessel having at its bottom a rotor which rotates on a vertical axis and which is adapted to be driven by the power takeoff shaft of the power stand upon which the machine is mounted.

However, such a power stand is inherently versatile since it can conceivably be used as a mounting pedestal and a source of driving power for any appliance having an input power shaft that rotates on a vertical axis and is accessible at the underside of the appliance; and it is thus a general object of this invention to provide an ice crushing machine having an upright rotor, the shaft of which projects downwardly and is adapted to be detachably connected wtih the power takeoff shaft of a power stand on which the machine may be mounted.

It is another object of this invention to provide an ice crushing machine of the character described adapted to be mounted on a power stand and having means for guiding crushed ice issuing therefrom into an open vessel placed alongside the power stand upon which the ice crusher is mounted.

Another object of this invention resides in the provision of a compact and efficient ice crusher having an ice crusher rotor mounted for rotation on an upright axis and wherein ice is constrained to move substantially horizontally past the rotor in the course of being crushed, from a hopper behind the rotor, through a crushing chamber in which the rotor is located, and out of an outlet in the front of the crushing chamber.

Another object of this invention resides in the provision of an ice crushing machine having a housing which is substantially S-shaped in side elevation, the rear of said housing providing a downwardly and forwardly curved hopper in which chunks of ice are adapted to be received, the medial portion of said housing providing an ice crushing chamber into which said hopper opens and in which a rotor rotatable on an upright axis is housed, and the front of said housing providing a spout opening downwardly and forwardly out of the crushing chamber and by which crushed ice expelled from the crushing chamber by the rotor is guidingly deflected downwardly into an open vessel placed beneath the machine.

Still another object of this invention resides in the provision of an ice crushing machine of the character described having a pusher by which chunks of ice may be moved lengthwise along a hopper and into a crushing rotor, to be crushed thereby, which pusher also serves to prevent an operator of the machine from getting his fingers into contact with the rotor.

It is also an object of this invention to provide an ice crushing machine of the character described having a housing defining a crushing chamber in which a rotor is rotatable on an upright axis and a hopper leading downwardly and forwardly to the crushing chamber and by which chunks of ice are guided into engagement with the rotor, and which machine incorporates a paddle-like pusher mounted for flatwise movement along the length of the hopper to carry ice chunks into the rotor, a manual actuator accessible at the exterior of the housing and connected with the pusher for actuating the same, and a cover for the housing swingable between open and closed positions and having a lost motion connection with the pusher so as to be also actuated by the manual actuator.

While the machine of this invention is herein described with specific reference to its adaptability for mounting on a power stand, it will be appreciated that the principles of the invention are also applicable to a machine having self-contained drive means.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best mode so far devised for the practical application of the principles thereof, and in which:

Figure 2 is a view of the ice crusher, partly in side elevation and partly in vertical section, showing the ice pusher and cover in their raised positions in which they permit insertion of chunks of ice into the hopper of the machine;

Figure 7 is a side elevational view, with parts broken away and shown in section, illustrating a modified form of the rotor; and Figure 8 is a disassembled perspective view of the rotor shown in Figure 7.

Figure 1:
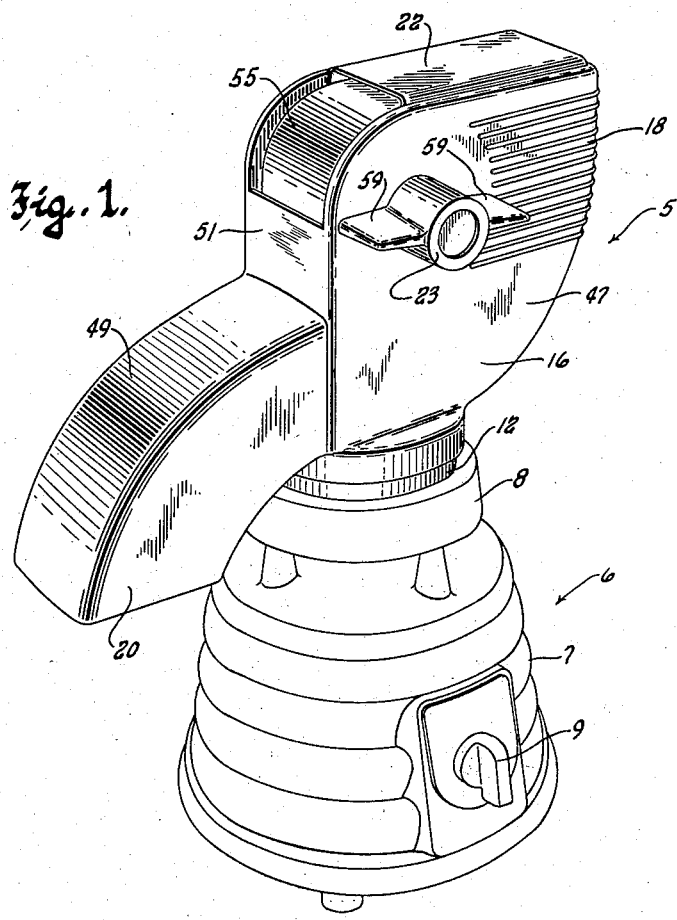
Figure 1 is a perspective view of the ice crushing machine of this invention, mounted on a power stand of the type with which it is adapted to be used.

Referring now to the accompanying drawings, in which like numerals designate like parts throughout the several views, the numeral 5 designates generally an ice crushing machine embodying the principles of this invention and which is adapted to be mounted on a power stand 6 of the type commonly used with food comminuting machines and other appliances.

The power stand, as is well known, comprises an enclosure 7 which has a mounting ring 8 at its top for gripping and supporting an appliance. A power takeoff shaft 10 is journaled in the power stand for rotation on an upright axis and has its upper end portion 11 accessible at the top of the power stand, concentric with the mounting ring 8, to be drivingly connectable with an input shaft of an appliance mounted on the power stand. The power takeoff shaft is of course driven by an electric motor (not shown) which is controlled by a switch having an actuator 9 accessible at the exterior of the power stand.

The ice crushing machine of this invention comprises, in general, a base 12 adapted to seat on and be gripped by the mounting ring 8 of a power stand, a rotor 13 having an upright input shaft 14 concentrically journaled in the base and detachably connectable with the power takeoff shaft 10 of a power stand, and a housing 16 defining a crushing chamber 17 around the rotor, an inlet hopper 18 behind the rotor, and an outlet spout 20 in front of the rotor. The machine also has a pusher 21 movably mounted in the housing, a cover 22 for the top of the hopper, and an actuator 23 for the pusher accessible at the exterior of the housing.

More specifically, the base 12 has a downwardly projecting annular flange or skirt 25, the outer surface of which tapers downwardly and inwardly so as to seat snugly in and having gripping engagement with the correspondingly tapered inner surface of the mounting ring 8 on a power stand. Upper and lower sleeve bearings 27 and 28 are press fitted into the bore of a downwardly projecting concentric boss 26 on the base. Journaled in these bearings is the input shaft 14 of the rotor 13, and upward displacement of the rotor shaft is prevented by a washer 29 confined between an upwardly facing circumferential shoulder on the shaft and the bottom of the upper sleeve bearing 27. At its bottom the rotor shaft provides a socket adapted to receive the projecting upper end portion 11 of the power shaft 10 to provide a readily disconnectable driving connection between said two shafts.

The rotor comprises, in general, a plurality of radial blades 31 arranged in axially spaced apart pairs, with the blades of each pair projecting in opposite lateral directions from the shaft and with the blades of each pair disposed at right angles to the blades of its axially adjacent pairs. The medial portion 32 of the rotor shaft 14 is non-circular in cross-section, being preferably substantially square, and the blade members are provided with correspondingly shaped holes 33 through which said portion of the rotor shaft projects and by which the blades are constrained to rotate with the shaft.

Figure 6:
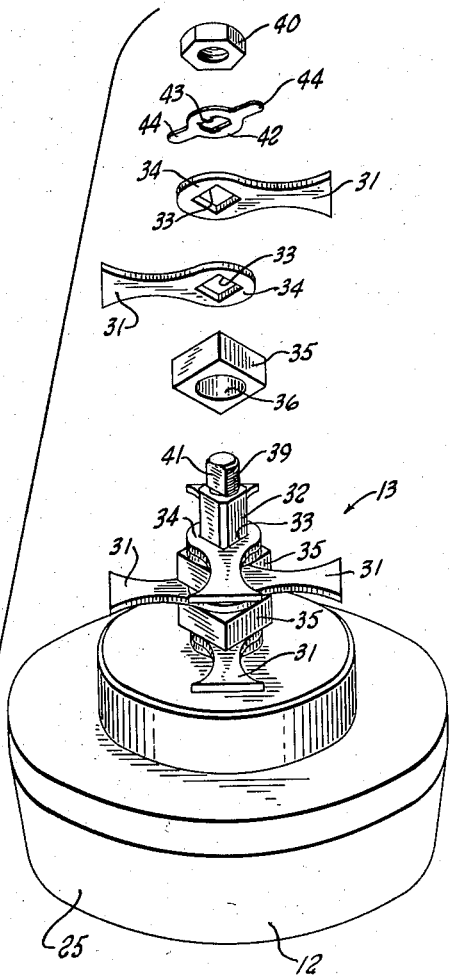
Figure 6 is a disassembled perspective view of one form of the rotor in the machine of this invention.

In the embodiment of the rotor illustrated in Figure 6, the two blades 31 comprising each pair are formed as separate members, each having an inner hub portion 34 with a square hole 33 therein. The blade members of each pair are axially adjacent to one another on the shaft, and the pairs of blades are held axially spaced apart along the shaft by means of block-like spacers 35 interposed between them. Each spacer has a coaxial bore 36 through which the shaft extends, and preferably has straight sides and square corners so as to cooperate with the blades in effecting disintegration of ice chunks brought into engagement with the rotor as it rotates.

In both embodiments of the rotor, the junction of the 8, the two blades of each pair are integral with one another and comprise arms 131 extending in opposite directions from a medial hub portion 34' having a square shaft receiving hole 33 therein. The axial spacers are provided by integral lugs 135 bent from opposite sides of the hub portion of each blade forming member to extend parallel to the shaft and engage the inner end portions of the blades of an axially adjacent member.

In both embodiments of the rotor, the junction of the non-circular medial portion 32 of the rotor shaft with its lower journal portion 37 defines an upwardly facing shoulder 38, and the uppermost portion 39 of the shaft is threaded to receive a nut 40. The rotor elements are confined between the shoulder 38 and the nut 40, and the lowermost rotor element overlies the top of the base to prevent downward displacement of the rotor.

Preferably, the threaded upper portion of the shaft has a non-circular cross-section by reason of the fact that opposite sides thereof are slabbed off, as at 41. Fitting on this portion of the shaft, between the uppermost rotor element and the nut 40, is a lock washer 42 having a hole 43 in its body the shape of which corresponds to that of the non-circular cross-section of the shaft so that the lock washer is constrained to rotate with the shaft. Integral ears 44 are bent up from the lock washer to engage opposite sides of the nut 40 and lock it against rotation relative to the shaft.

The housing is substantially S-shaped as viewed in side elevation and may be readily molded or cast as a single unit. The upper portion of the base projects into an opening 45 in the bottom of the housing, and the base is secured to the underside of the housing as by means of screws 46. Extending upwardly from the bottom of the housing are a pair of spaced apart parallel side walls 47. The side walls define the crushing chamber 17 which is directly above the base, and they also extend rearwardly and upwardly from the crushing chamber to define the hopper portion 18 of the housing, and project forwardly and downwardly from the crushing chamber to define the spout 20. The rear edges of the side walls curve upwardly and rearwardly from the base and are joined by a rear wall 48, which extends upwardly from the base to the top edges of the side walls and cooperates with the rear portions of the side walls in defining the hopper portion of the housing. Top and bottom walls 49 and 50 cooperate with the forwardly and downwardly projecting portions of the side walls to define the spout 20, and a short front wall 51 projects upwardly from the rear end of the spout.

Confined between the side walls, directly above the rotor, is a hub member 52 from which the pusher 21 projects substantially radially, being preferably molded integrally with the hub member. The hub member is mounted on a shaft 53 which is rotatably journaled in the side walls of the housing, directly above the rotor, and has its axis normal to the side walls and to the axis of the rotor shaft. At its medial portion, where it extends through the hub member the shaft 53 has a flat side 54 by which the hub member is constrained to rotate with it, and rotation of the hub member in opposite directions swings the pusher upwardly and downwardly in the hopper.

The circumferential wall of the hub member comprises a substantially cylindrical portion 55 and a pair of substantially flat portions 56 and 57 which extend from the cylindrical portion and which are substantially perpendicular to one another. The pusher extends from the flat wall portion 57, substantially at right angles thereto. The hub member is spaced above the base and cooperates with the side walls of the housing in defining the crushing chamber 17, and also cooperates with the rear wall 48 and with the upwardly and rearwardly projecting portions of the side walls to define the downwardly and forwardly curved hopper 18. The radius of curvature of the rear wall 48 is preferably substantially concentric with that of the cylindrical wall portion of the hub member, and the hopper therefore opens at its front end directly into the rear of the crushing chamber. It will be observed that the crushing chamber is open and unrestricted at its front and rear.

Figure 4:
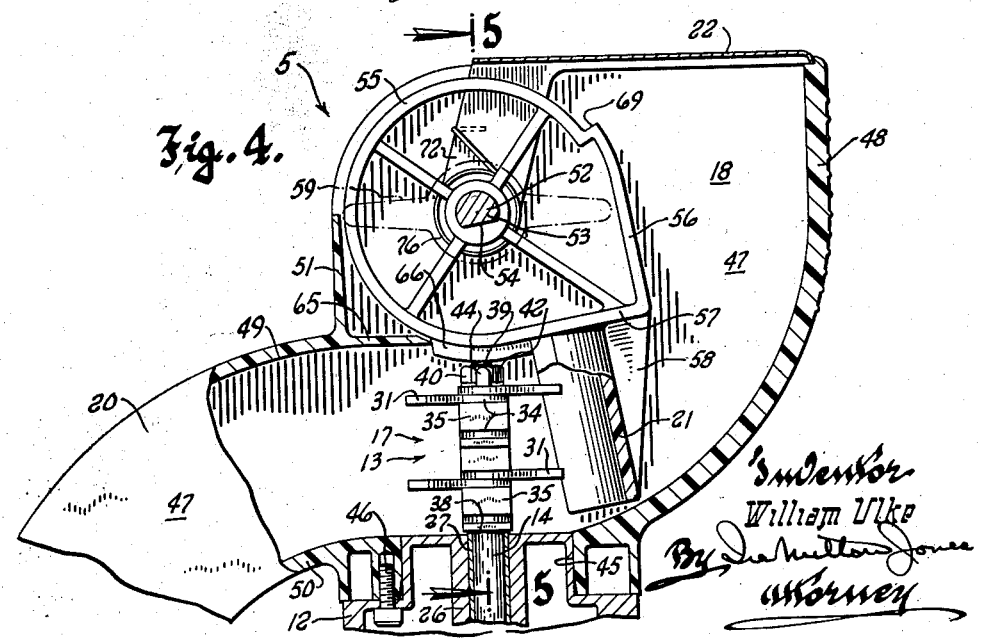
Figure 4 is a view similar to Figure 2 but showing the machine with the pusher in its lowermost position.
Figure 5:
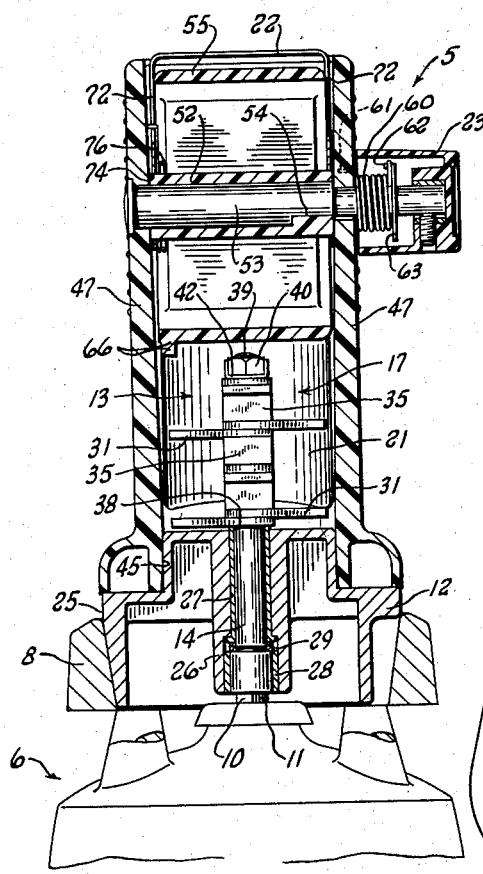
Figure 5 is a vertical sectional view taken on the plane of the line 5—5 in Figure 4.

The pusher 21 is substantially paddle shaped, but because it is intended to drive ice chunks into engagement with the rotor it preferably has an arcuate cross-section so as to partially embrace the rotor blades substantially concentrically when swung to its lowermost position shown in Figure 4. The pusher can also be swung to an upper position (illustrated in Figure 2) in which it projects obliquely above the top edges of the side walls, away from the top of the hopper, to permit ice chunks to be loaded into the hopper. The pusher may be reinforced by a medial rib 58 extending lengthwise along it and connecting at its inner end with the flat wall portion 57 of the hub member.

To enable the pusher to be swung to its different positions, an end portion of shaft 53 projects outwardly beyond one side wall of the housing and has the actuator 23 anchored thereon. Opposite wings 59 extend radially from the actuator to facilitate its manipulation, and the actuator end portion of shaft 53 preferably has a D-shape or other non-circular cross-section to insure that said shaft will rotate with the actuator and that the hub member, in turn, will rotate with it.

A helical torsion spring 60, surrounding the projecting end portion of shaft 53 and housed in the hollow hub of the actuator knob, biases the pusher to its lowermost position. One end portion of this spring is hooked into a slot 61 in the adjacent housing side wall, and its other end portion is hooked around a lug 62 on a washer 63 on the shaft, which washer has a D-shaped hole therein corresponding to the cross-section of the shaft, so as to transmit the torsional biasing force of the spring to the shaft and thus to the pusher. The bias exerted upon the pusher by the spring 60 may be sufficient to enable the pusher to drive ice chunks through the rotor without manual assistance, or if a lesser degree of resistance to manual raising of the pusher is desired, the spring may be designed to exert a lesser biasing force and the required additional force to drive ice chunks into the rotor may be manually exerted upon the pusher by means of the actuator.

Extending rearwardly from the front housing wall 51, tangentially to the cylindrical wall surface of the hub member and closely adjacent thereto, there is a horizontal housing wall element 65 which cooperates with the cylindrical wall of the hub member in defining the top of the crushing chamber, and which also serves as a stop by which the lowermost position of the pusher is defined. The rear edge of this wall element is engaged, in the lowermost position of the pusher, by the rear edge of a circumferentially short flange 66 projecting radially from the cylindrical wall portion of the hub member, at one side thereof, and extending forwardly from the pusher. The uppermost position of the pusher is defined by the engagement of a step-like abutment 69 in the cylindrical wall portion of the hub member against the top edge of the front wall 51 of the housing.

The cover 22 comprises a plate-like member adapted to overlie the top of the hopper. Integral legs 72 extending downwardly from opposite side edges of the cover, near the rear thereof, straddle the hub member and have aligned holes 74 near their lower ends through which the shaft 53 extends to mount the cover for up and down swinging motion to its open and closed positions.

Figure 3:
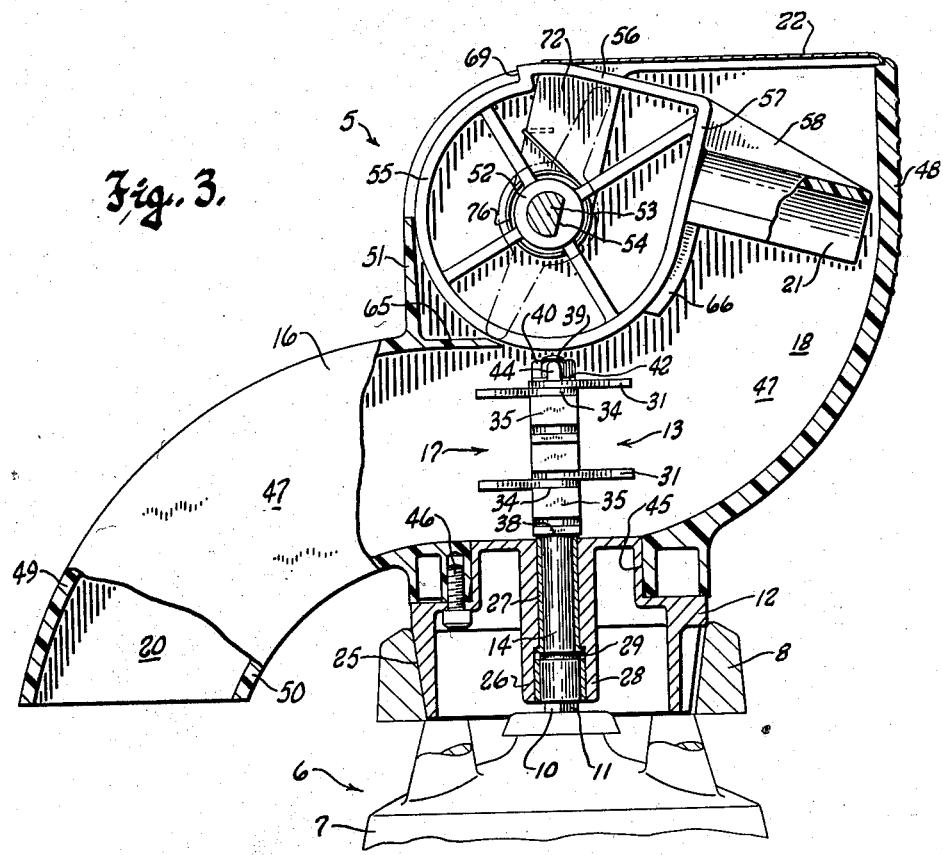
Figure 3 is a view similar to Figure 2 but showing the machine with the pusher in an intermediate position and the cover closed.

The closed position of the cover is defined by the engagement of its rear marginal edge portion with the upper edge of the rear wall 48 of the housing, and when the cover is closed a portion of the cylindrical wall portion of the hub member is exposed between the front edge of the cover and the upper edge of the front housing wall 51, as may be seen in Figures 3 and 4. As the pusher is swung upwardly by means of the actuator, the flat hub member wall portion 56 flatwise engages the underside of the cover and swings it upwardly and forwardly along with the pusher.

In their uppermost positions (see Figure 2) the pusher and cover project almost vertically upwardly, leaving the top of the hopper clear for the insertion of chunks of ice thereinto. A torsion spring 76, surrounding the shaft 53 and confined between one cover leg 72 and the hub member, reacts between the hub member and said leg to lightly bias the cover rearwardly and downwardly with the pusher, assuring that the cover will swing downwardly to its closed position as the pusher moves downwardly into the hopper. After the cover has moved to its closed position the pusher can, of course, continue its downward swinging movement, so that there is a lost motion connection between the pusher and the cover.

Preferably the height of the hopper portion of the housing, and the distance between the housing side walls, are so selected that it is normally impossible for a person to insert his hand into the housing a sufficient distance to bring his fingers into engagement with the rotor blades.

The spout at the front of the housing is also sufficiently long and narrow to prevent a person from engaging his fingers with the rotor through the open front of the crushing chamber. The spout also serves as a deflector whereby crushed ice issuing from the front of the crushing chamber is guided downwardly into a bowl or other vessel placed under the mouth of the spout. Without such deflector means, crushed ice would be thrown outwardly from the rotor with substantial force and would be propelled straight forwardly out of the housing in a manner that would make it difficult to collect.

From the foregoing description taken together with the accompanying drawings, it will be apparent that this invention provides an ice crushing machine which is especially adapted for use with an appliance power stand by reason of the fact that it has a crushing rotor with an upright axis and having a shaft projecting downwardly to be accessible at the underside of the machine, and it will also be apparent that the machine of this invention is very convenient and efficient to use by reason of the provision of the pusher by which ice chunks are propelled downwardly and forwardly along the hopper and into the rotor orbit and the provision of an outlet spout by which crushed ice is deflected downwardly into a bowl or the like located beneath the machine.

What I claim as my invention is:

1. An ice crusher adapted to be driven by power means, comprising: a substantially S-shaped housing defining a downwardly and forwardly curved inlet hopper with an opening at its top into which ice chunks may be inserted, a medial crushing chamber into the rear of which said inlet hopper opens at its lower end and in which ice chunks may be crushed, and a downwardly and forwardly curved outlet spout communicated at its rear with the front of the crushing chamber and having an outlet at its bottom through which crushed ice issuing from the crushing chamber and deflected downwardly by said spout can emerge from the housing; a rotor in said crushing chamber portion of the housing mounted for rotation on an upright axis and drivingly connectable with power means, said rotor comprising a plurality of axially spaced apart radially extending blades, each long enough to sweep across a substantial portion of the width of the crushing chamber; a paddle-like pusher in the hopper portion of the housing, mounted for swinging flatwise motion about an axis above and substantially in line with the rotor and extending transversely to the rotor axis, said pusher being swingable between an upper position in which it projects upwardly out of the housing, clear of the inlet hopper, to permit ice chunks to be loaded thereinto, and a lower position in which the pusher is disposed closely adjacent to the rotor blades, at the back of the crushing chamber, and said pusher having a shape and size to extend substantially entirely across the area of the hopper so that ice chunks in the hopper will be driven into the rotor by swinging of the pusher from its upper to its lower position; means including a manual actuator accessible at the exterior of the housing and connected with the pusher for swinging the pusher from one of its positions to the other; a cover mounted for swinging motion substantially coaxially with the pusher, between a closed position overlying the top of the inlet hopper and an upwardly projecting open position clear of the top of the inlet hopper; spring means biasing the cover to its closed position; and a lost motion connection between the pusher and the cover whereby raising the pusher to its upper position lifts the cover to its open position against the force of said spring means, and lowering of the pusher toward its lower position allows the cover to be closed by said spring means.

2. An ice crusher adapted to be detachably mounted on and driven by a power unit having a mounting ring at its top to receive and grip an appliance to be driven by the power unit, and a power output shaft projecting from the top of the unit concentrically with its mounting ring, said ice crusher comprising: a base; a skirt depending from the base, said skirt being adapted ot fit inside the mounting ring of the power unit and have gripping engagement therewith; a rotor having axially spaced apart radially extending blades, said rotor being journalled in the base to turn on a vertical axis concentric to the skirt with its bladed portion projecting upwardly of the base, the lower end of the rotor being drivingly connectable with the power output shaft of the power unit; a pair of upright side walls fixed with respect to the base on opposite sides of the bladed portion of the rotor defining the sides of a crushing chamber which is open at its front and rear; means defining a hopper located behind the crushing chamber and extending above the same, said hopper being communicated at its lower portion with the rear of the crushing chamber and being adapted to guide ice chunks placed in its top downwardly and forwardly into the rear of the crushing chamber; and deflector means extending downwardly and forwardly from the front of the crushing chamber for guidingly constraining crushed ice expelled from the front of the crushing chamber by the rotor to move downwardly so that such crushed ice may be caught in an open vessel placed beneath the ice crusher.

3. An ice crusher adapted to be driven by power drive means, comprising: a base; a rotor journaled in the base for rotation on an upright axis and drivingly connectable with power drive means, said rotor comprising a plurality of axially spaced apart radially extending blades; a pair of upright, spaced apart side walls fixed on the base at opposite sides of the rotor and projecting upwardly from the base to a level above the top of the rotor; a hub member spanning the space between the side walls and journaled for rotation on an axis spaced above the rotor and transverse thereto, said hub member having a cylindrical surface concentric with its axis which cooperates with the base and the adjacent portions of the side walls to define a crushing chamber in which the rotor is located; a fixed downwardly and forwardly inclined rear wall joined with the side walls and extending from the tops of the side walls to the base, said rear wall cooperating with the side walls and the hub member to define a downwardly and forwardly curved hopper which is open at its top and which is communicated at its bottom with the crushing chamber; and a paddle-like pusher on said hub member, projecting substantially radially from said cylindrical surface thereon, said pusher being swingable in consequence of rotation of the hub member on its axis between a position in which the pusher is disposed above the top of the hopper to permit chunks of ice to be placed in the hopper and a position in which the pusher is adjacent to the rotor, behind the same, and by which pusher chunks of ice fed into the hopper may be propelled into the crushing chamber; and a manual actuator accessible at the exterior of the housing and connected with the hub member for rotating the same to swing the pusher between its upper and lower positions.

4. An ice crusher adapted to be mounted on a power stand of the type comprising a pedestal enclosure having mounting means at its top for supporting an accessory and having an upright power driven shaft, the upper end of which is accessible at the top of the pedestal enclosure for connection with an accessory mounted thereon, said ice crusher comprising: a base cooperable with mounting means on a pedestal enclosure to be supported thereon; a rotor journaled in said base for rotation on an upright axis and having its lower end portion accessible at the bottom of the base for connection with the upper end of a power shaft, said rotor comprising a plurality of axially spaced apart radially extending blades; a pair of substantially parallel side walls extending upwardly from the base at opposite sides of the rotor and projecting rearwardly from the base; means defining a curved wall spanning said side walls, above the rotor, the axis of curvature of said wall being transverse to the side walls and said curved wall cooperating with the base and the lower portions of the side walls to define a crushing chamber in which the rotor is housed; an end wall joined with the side walls at their rear edges and extending from the tops of the walls to the base, said end wall being spaced from the curved wall and sloping downwardly and forwardly to cooperate with the curved wall and with other portions of the side walls to define a hopper curving downwardly and forwardly to the crushing chamber and along which chunks of ice fed into the top of the hopper may be guided into the crushing chamber; a paddle-like pusher in the hopper flatwise swingable along the length of the hopper between an upper position disposed above the hopper and permitting ice chunks to be fed into the top thereof and a lower position adjacent to and behind the rotor, by which pusher ice chunks in the hopper can be propelled into the crushing chamber to be crushed by the rotor; and an actuator accessible at the exterior of the hopper and connected with the pusher, for swinging the pusher from one of its positions to the other.

References Cited in the file of this patent

UNITED STATES PATENTS

| | | |
|---|---|---|
| 384,299 | Way | June 12, 1888 |
| 2,181,000 | Shively | Nov. 21, 1939 |
| 2,426,346 | Feight | Aug. 26, 1947 |
| 2,435,030 | Brady | Jan. 27, 1948 |

FOREIGN PATENTS

| | | |
|---|---|---|
| 295,344 | Switzerland | Dec. 31, 1953 |
| 650,386 | Great Britain | Feb. 21, 1951 |

UNITED STATES PATENT OFFICE
CERTIFICATE OF CORRECTION

Patent No. 2,879,951                                         March 31, 1959

William Ulke

It is hereby certified that error appears in the printed specification of the above numbered patent requiring correction and that the said Letters Patent should read as corrected below.

Column 3, lines 60 and 61, for "In both embodiments of the rotor, the junction of the 8" read -- In the rotor embodiment illustrated in Figures 7 and 8 --; column 4, line 56, before "side" insert -- base and with the --; column 7, line 11, for "ot" read -- to --; column 8, line 32, before "walls" insert -- side --.

Signed and sealed this 21st day of July 1959.

(SEAL)
Attest:

KARL H. AXLINE                                                  ROBERT C. WATSON
Attesting Officer                                          Commissioner of Patents